July 22, 1924.
A. M. ROSSMAN ET AL
1,502,442
BUS STRUCTURE
Filed May 12, 1920 11 Sheets-Sheet 2
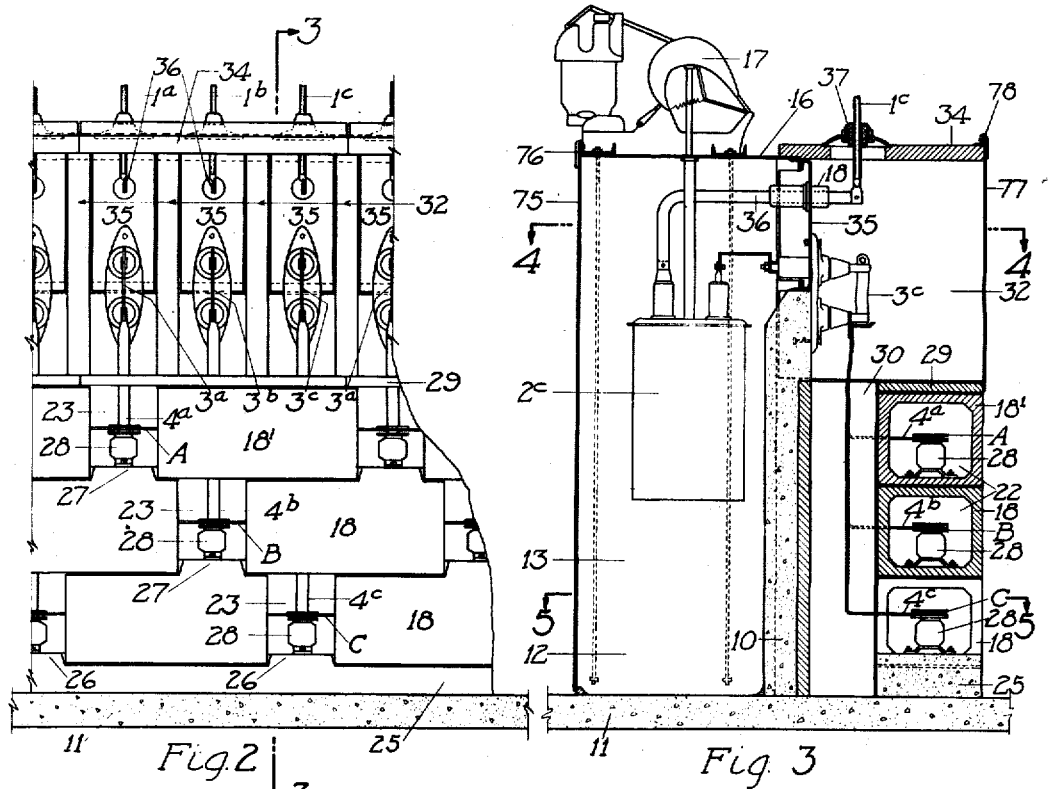
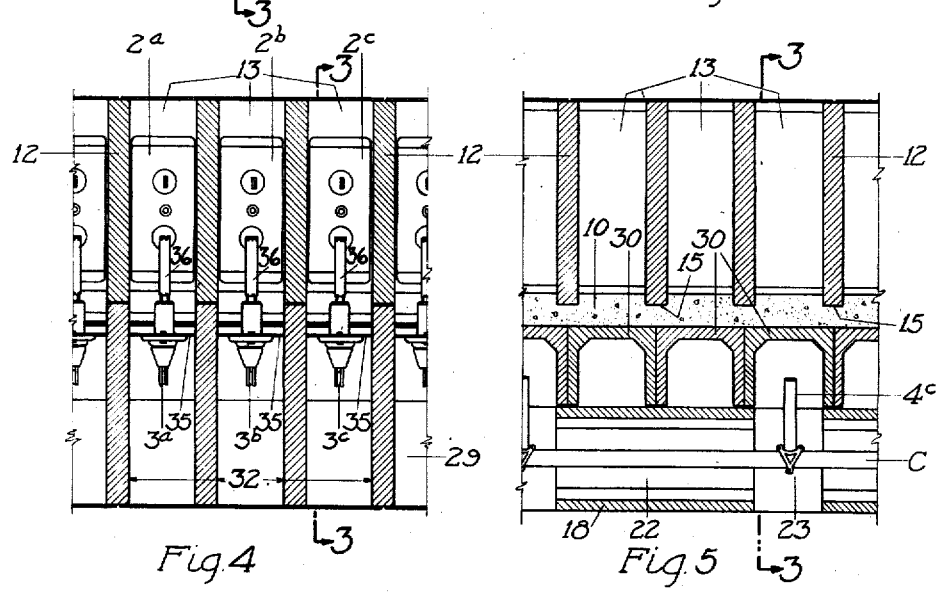
Witnesses
Inventors
Allen M. Rossman
John C. Sanderson
by Brown Boucher Dunn
Attorney July 22, 1924.

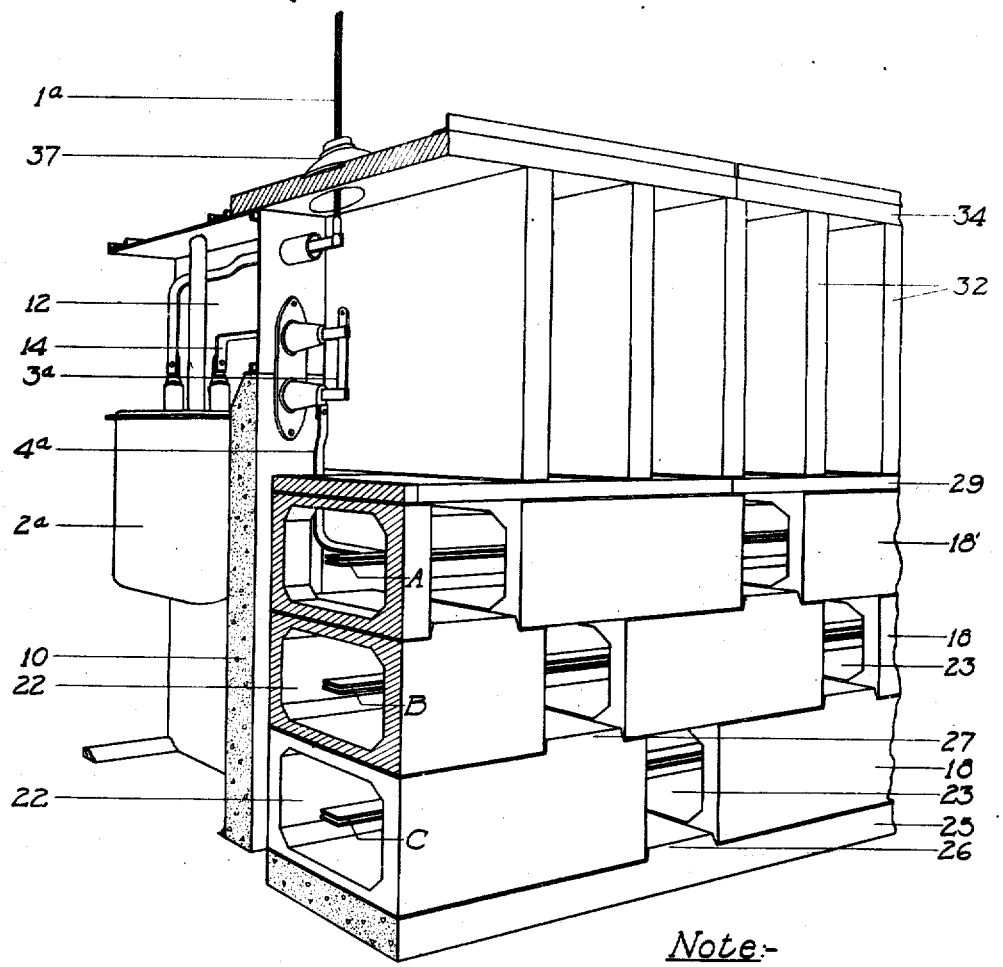

A. M. ROSSMAN ET AL 1,502,442

BUS STRUCTURE

Filed May 12, 1920   11 Sheets-Sheet 3

July 22, 1924. 1,502,442
A. M. ROSSMAN ET AL
BUS STRUCTURE
Filed May 12, 1920 11 Sheets-Sheet 4

Inventors
Allen M. Rossman
John C. Sanderson
by
Attorney

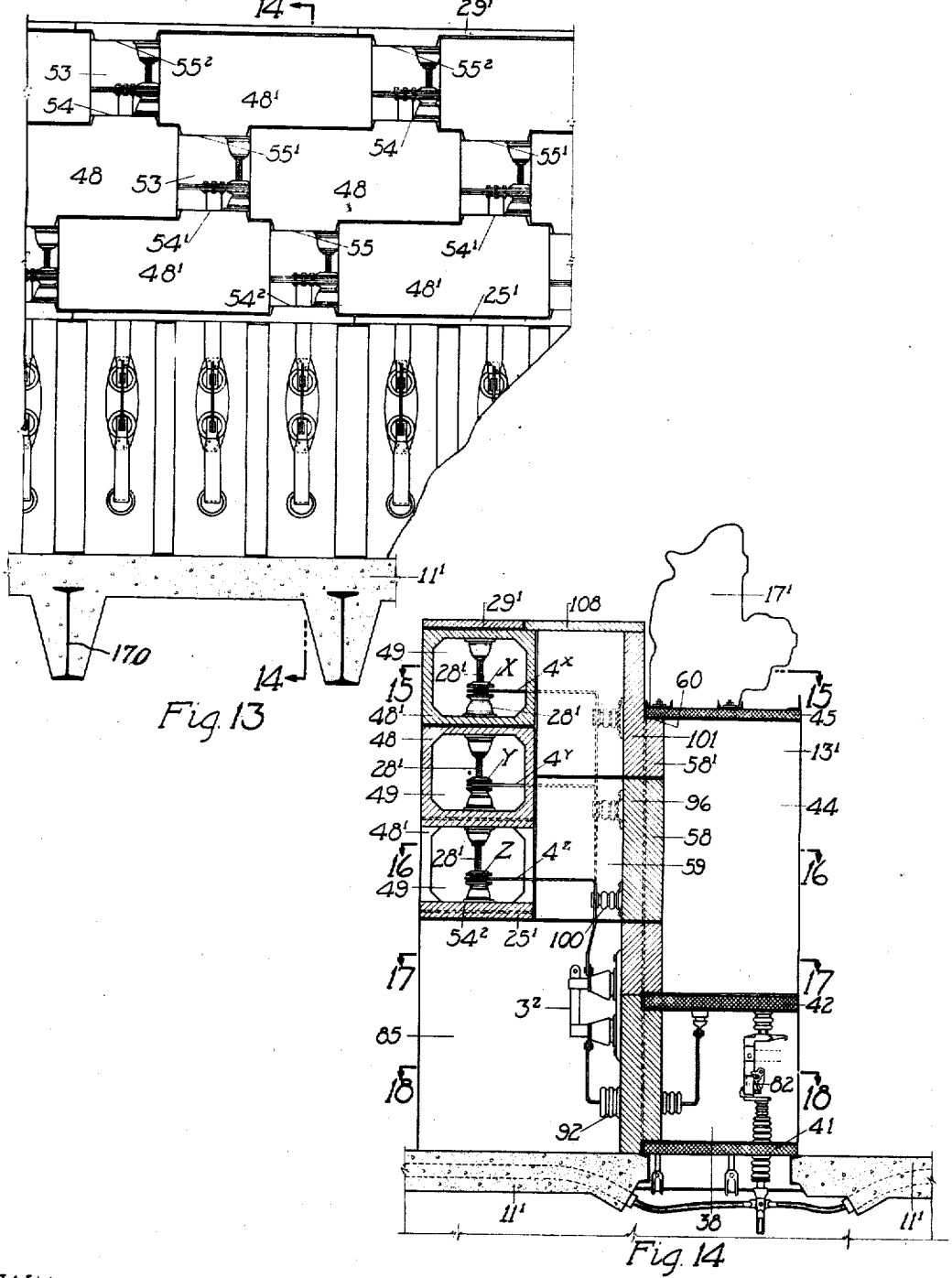

July 22, 1924.

A. M. ROSSMAN ET AL 1,502,442

BUS STRUCTURE

Filed May 12, 1920    11 Sheets-Sheet 7

Inventors
Allen M. Rossman
John C. Sanderson
by Brown, Boettcher & Dienner
Attorney

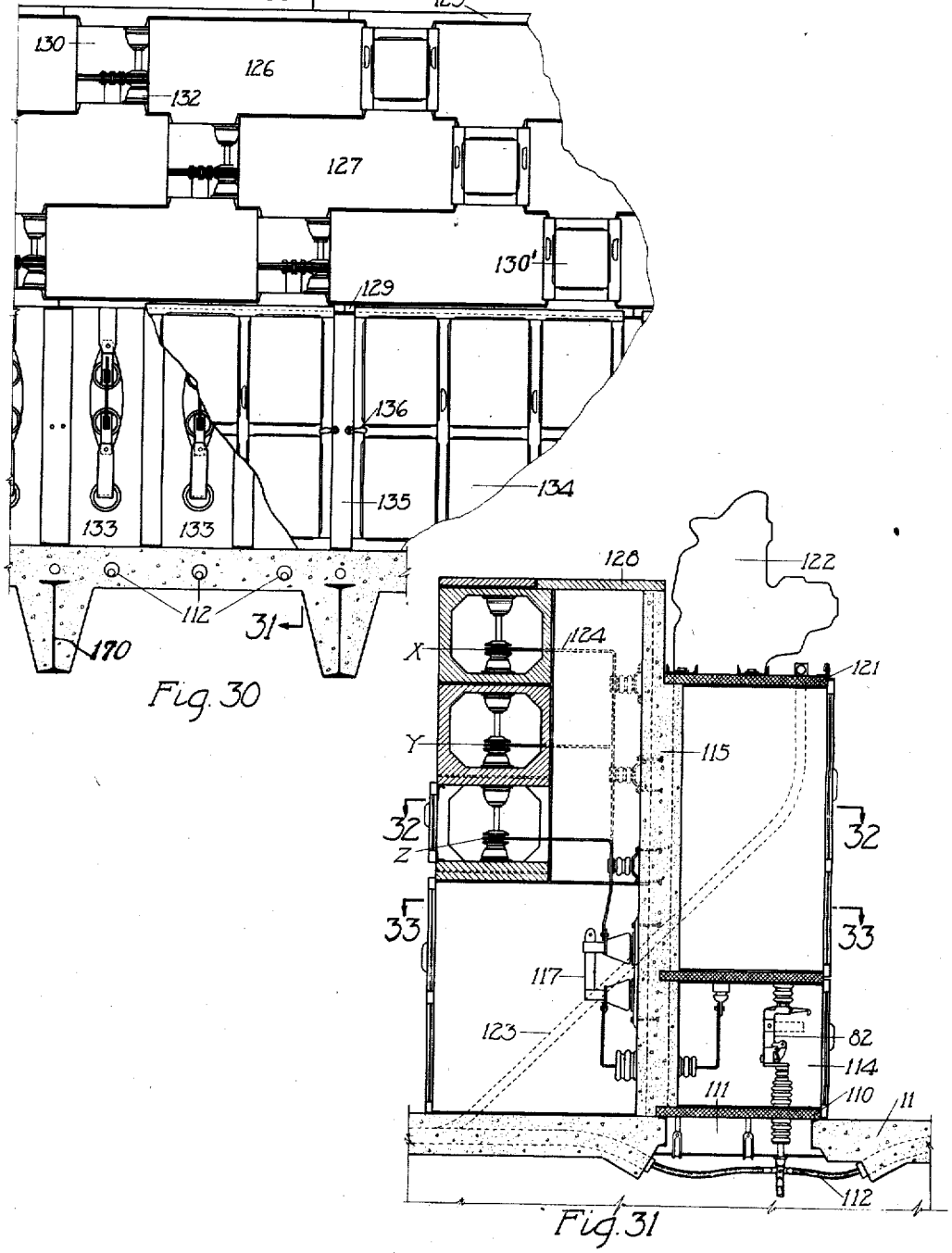

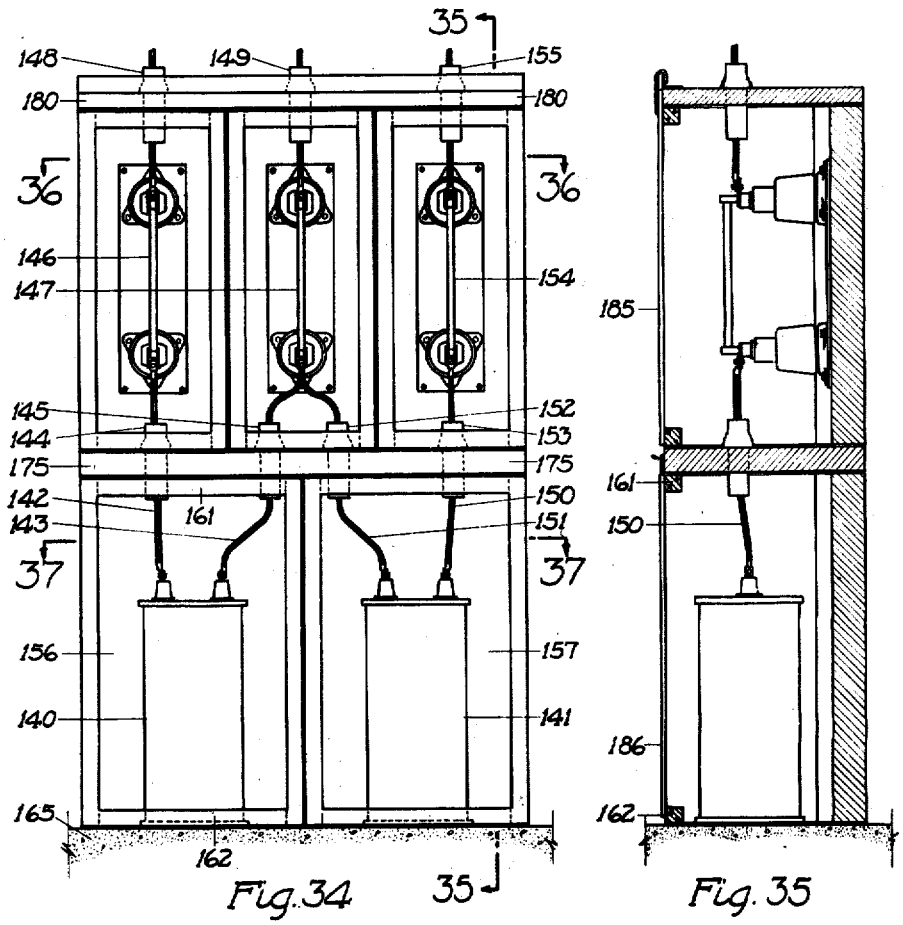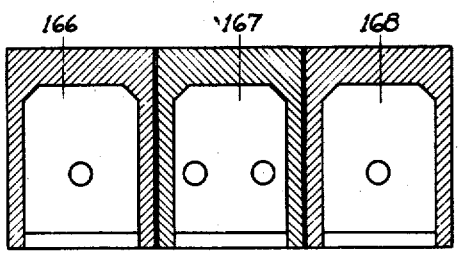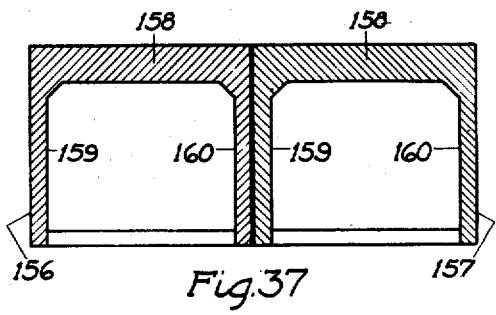

July 22, 1924.
A. M. ROSSMAN ET AL
1,502,442
BUS STRUCTURE
Filed May 12, 1920     11 Sheets-Sheet 11
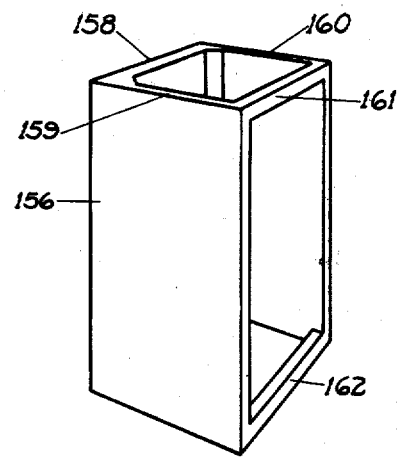
Fig. 39
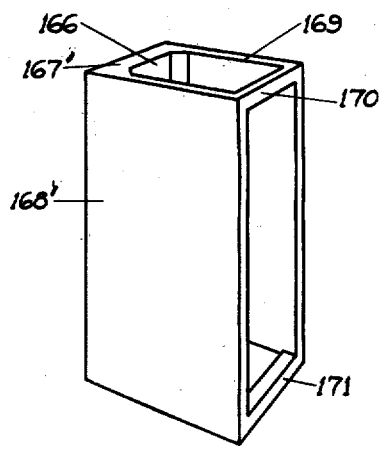
Fig. 38
Fig. 41-A
Fig. 41
Fig. 40    Fig. 40A
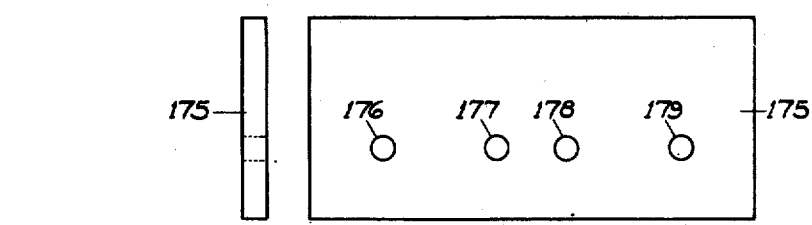
Fig. 43-A.    Fig. 43
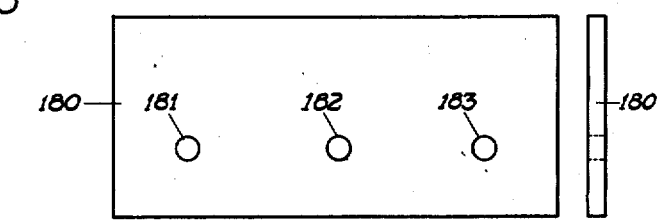
Fig. 42    Fig. 42A.
Witnesses
Inventors
Allen M. Rossman
John C. Sanderson
by
Attorneys.

Patented July 22, 1924.

1,502,442

UNITED STATES PATENT OFFICE.

ALLEN M. ROSSMAN AND JOHN C. SANDERSON, OF CHICAGO, ILLINOIS, ASSIGNORS TO SARGENT & LUNDY, INCORPORATED, OF CHICAGO, ILLINOIS, A CORPORATION OF ILLINOIS.

BUS STRUCTURE.

Application filed May 12, 1920. Serial No. 380,861.

*To all whom it may concern:*

Be it known that we, ALLEN M. ROSSMAN and JOHN C. SANDERSON, citizens of the United States, residing at Chicago, in the county of Cook and State of Illinois, have invented a certain new and useful Improvement in Bus Structures, of which the following is a full, clear, concise, and exact description, reference being had to the accompanying drawings, forming a part of this specification.

This invention relates to bus structures.

In the construction of electrical power and substations it is customary to house the electrical apparatus in fireproof enclosures. The rotary machinery must, of course, be mounted under cover more or less in the open to be accessible for attention. The indicating and controlling apparatus is also mounted more or less in the open but the various conductors which carry the power current are generally either housed in fireproof conduits or mounted on insulated fireproof supports. The main buses generally run longitudinally of the power station and the various feeders or connections are made by cross connections similarly supported. The circuit breakers for the connection of the various feeders or connections are housed in fireproof compartments or cells, particularly to permit the circuit breakers to be located adjacent each other without endangering adjacent apparatus by the arcing of a circuit breaker which is opened.

The cells and compartments for the various parts of the bus and oil circuit breaker structure have heretofore been made of stone, brick or concrete set in place or of prepared slabs of material set with cement or in concrete.

We have found that such construction is disadvantageous in that the work of mounting the electrical apparatus must wait upon completion of the cell structure and this in turn must wait upon completion of the building. As forms and braces must be employed for concrete, either a large amount of material must be employed for forms or a long time is required to complete the construction. The structure is also quite bulky and takes up more room and material than is absolutely necessary, as we have demonstrated.

Our invention proceeds upon the conception that the cell and bus structure can be built of a number of identical units which may be prepared while the building is being constructed and which can then be quickly and neatly assembled into a complete structure when the other parts of the building are far enough completed to furnish foundations or floors. The result is that the electrical apparatus may be installed as soon as the building is roofed over and foundations completed and the time required to construct the bus and cell structure is so much shortened that no part of the installation waits upon another. The units of which the cell structure is composed can be laid out and prepared or manufactured while the building is being erected so that when the work on the building has progressed far enough to permit it, these prepared blocks or units are then laid in place. This work may be accomplished very rapidly and cheaply.

The principal object of our invention is to provide such a construction capable of securing the advantages above noted.

Other objects and advantages will hereinafter appear.

Two specific embodiments of the invention are illustrated in the accompanying drawings, in which:

Figure 1 is a perspective view of a construction embodying our invention;

Figure 2 is a front elevation of a combined bus and oil circuit breaker structure made in accordance with the present invention;

Figure 6:
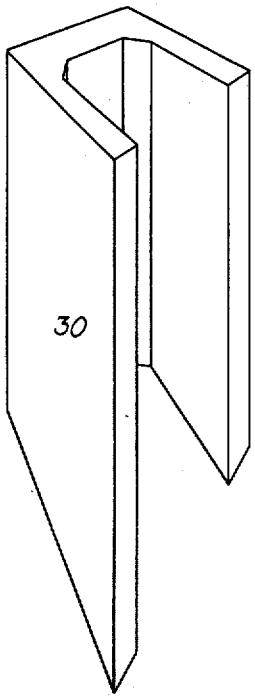

Figure 3 is a vertical section taken on the line 3—3 of Figure 2 (the same section being indicated by the lines 3—3 on Figures 4 and 5);

Figure 4 is a horizontal section taken on the line 4—4 of Figure 3;

Figure 5 is a horizontal section taken on the line 5—5 of Figure 3;

Figure 6 is a perspective view of a block employed in building up the structure of Figures 1 to 5.

Figure 7:
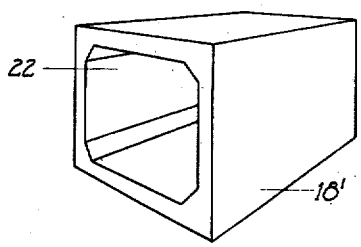
Figure 8:
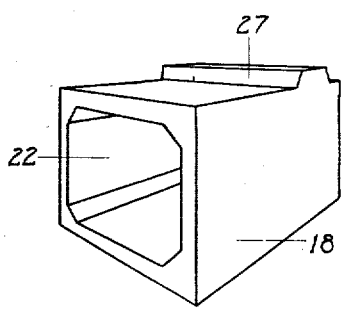
Figure 9:
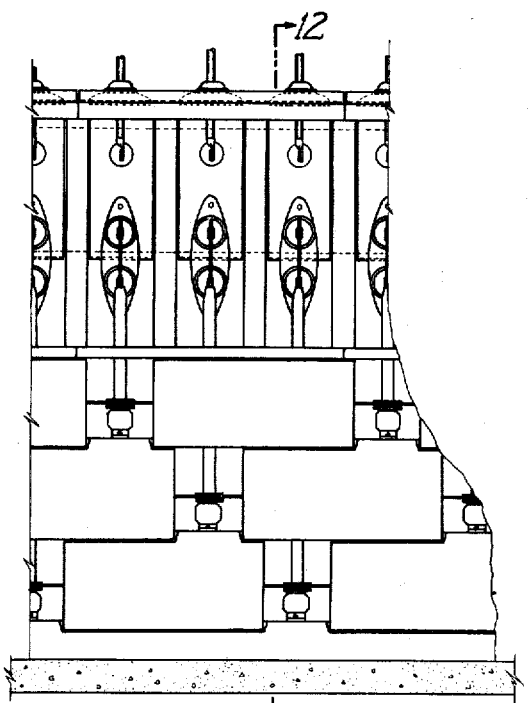
Figure 12:
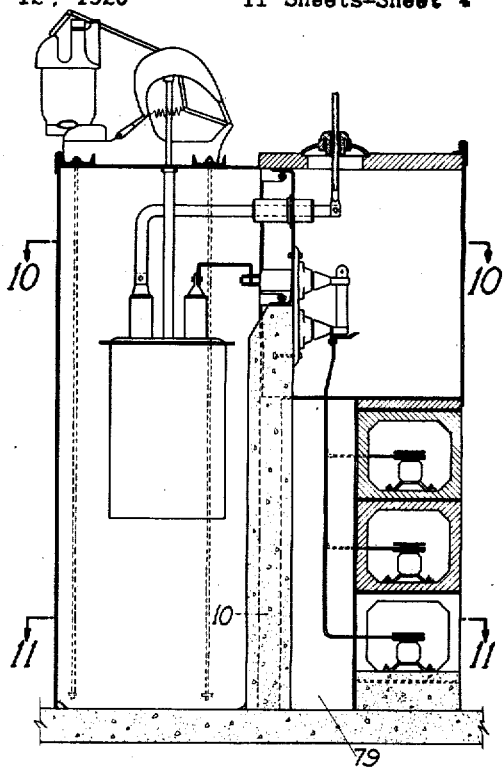
Figure 10:
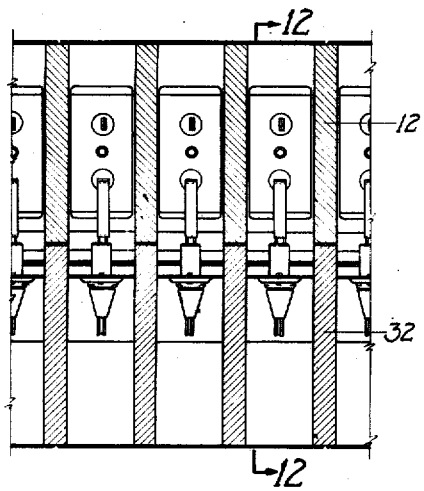
Figure 11:
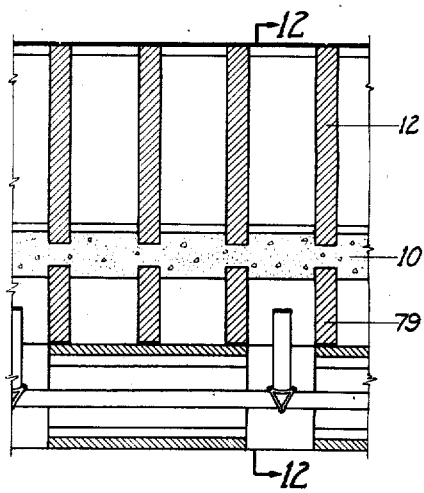

Figures 7 and 8 are views in perspective of two forms of blocks employed in building up the structure illustrated in Figures 1 to 5 and 9 to 12;

Figure 9 is a front elevation of a modification employing precast slabs instead of channel blocks for forming the vertical conduits for the taps;

Figure 10 is a horizontal sectional view taken on the line 10—10 of Figure 12;

Figure 11 is a similar view taken on the line 11—11 of Figure 12;

Figure 12 is a vertical cross section taken on the line 12—12 of Figure 9 (the same section being indicated by lines 12—12 on Figures 10 and 11);

Figure 13 is a front elevation of a second modification of the invention particularly employing an oil circuit breaker having bottom connections.

Figure 15:
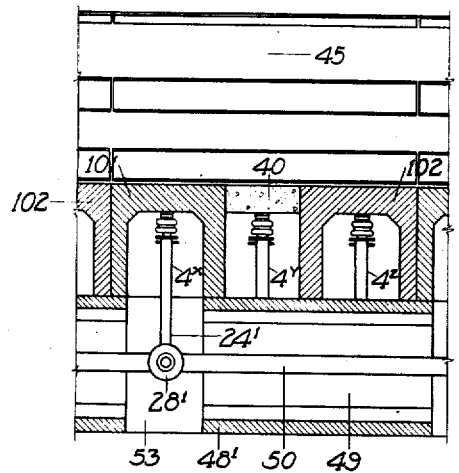
Figure 16:
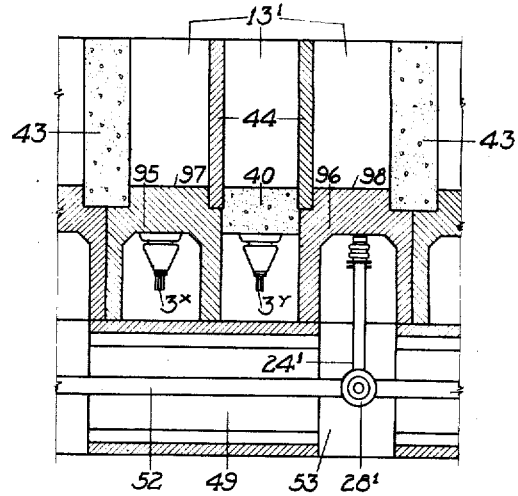
Figure 17:
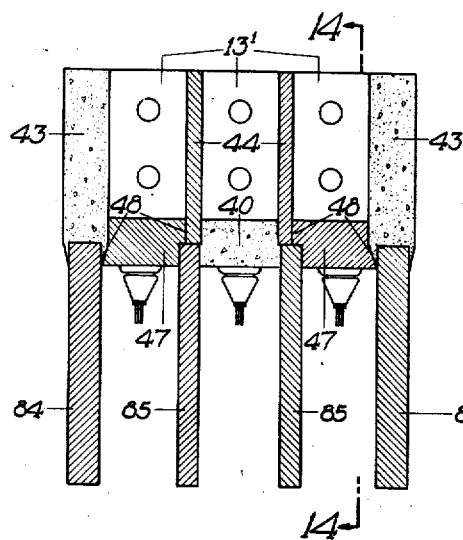
Figure 18:
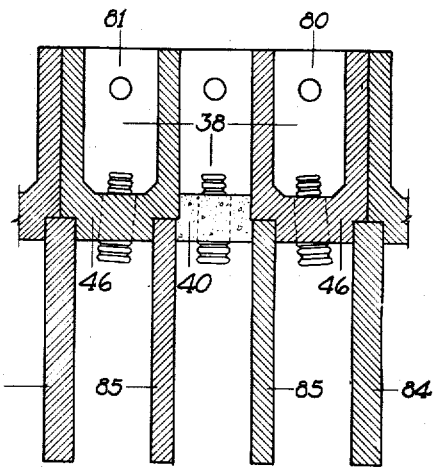
Figure 19:
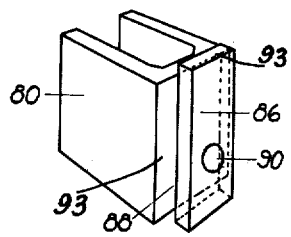
Figure 20:
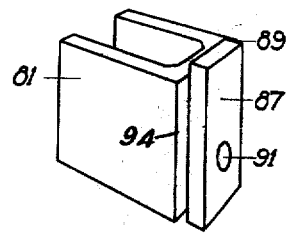
Figure 21:
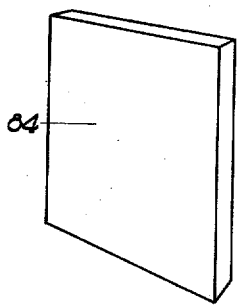
Figure 22:
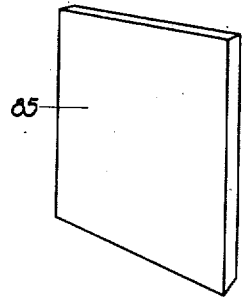
Figure 23:
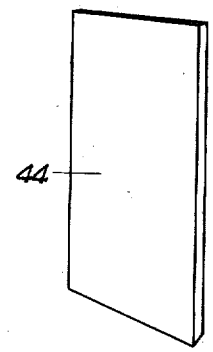
Figure 24:
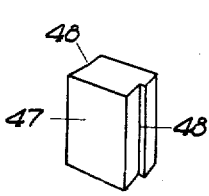
Figure 25:
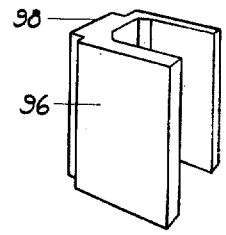
Figure 26:
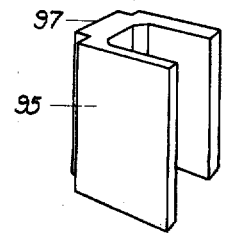
Figure 27:
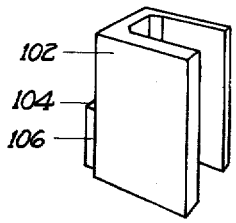
Figure 28:
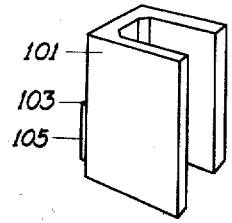
Figure 29:
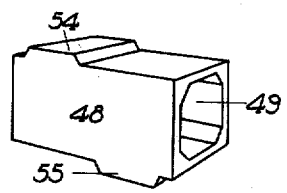
Figure 32:
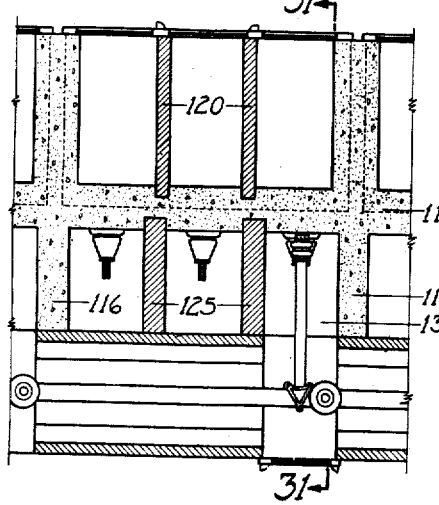
Figure 33:
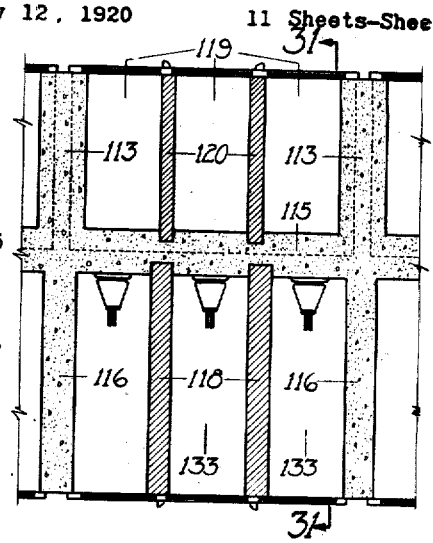

Figure 14 is a vertical section taken on the line 14—14 of Figure 13;

Figure 15 is a horizontal section taken on the line 15—15 of Figure 14;

Figure 16 is a horizontal section taken on the line 16—16 of Figure 14;

Figure 17 is a horizontal section taken on the line 17—17 of Figure 14;

Figure 18 is a horizontal section taken on the line 18—18 of Figure 14;

Figures 19 and 20 are perspective views of the channel blocks forming the posterior disconnecting switch cells;

Figures 21 and 22 are perspective views of the slabs lying at the backs of the blocks shown in Figures 19 and 20 for forming the anterior disconnecting switch cells and for supporting the hollow wall for mounting the busses;

Figure 23 is a perspective view of the slabs employed as partitions for the oil circuit breaker cells;

Figure 24 is a perspective view of the filler block for spacing the slabs shown in Figures 21 and 22 from each other and for joining them to the slabs shown in Figure 23;

Figures 25 and 26 are perspective views of the channel blocks forming the lower ends of the conduits for the taps and which blocks rest upon the slabs shown in Figures 21 and 22;

Figures 27 and 28 are perspective views of the channel blocks which are seated upon the blocks shown in Figures 25 and 26 and which form the upper ends of the conduits for the taps;

Figure 29 is a perspective view of one of the hollow blocks employed in constructing the hollow wall for mounting the horizontal busses;

Figure 30 is a front elevational view of a modification of the structure employing a bottom connected oil circuit breaker;

Figure 31 is a sectional elevation taken on the line 31—31 of Figure 30;

Figure 32 is a horizontal section taken on the line 32—32 on Figure 31;

Figure 33 is a similar section taken on the line 33—33 of Figure 31;

Figure 34 is a front elevation of a potential transformer housing shown with the front door removed;

Figure 35 is a section taken on the line 35—35 of Figure 34;

Figure 36 is a horizontal cross sectional view taken on the line 36—36 of Figure 34;

Figure 37 is a similar horizontal cross section taken on the line 37—37 of Figure 34;

Figure 38 is a perspective view of one of the precast blocks for forming a fuse switch cell, such as shown in the upper portion of Figure 34;

Figure 39 is a similar view of a precast block for forming the housing for one of the transformers shown in the lower portion of Figure 34;

Figure 40 shows a front elevation; and

Figure 40$^A$ an end elevation of the reinforced brace and tie members employed in the block as shown in Figure 38;

Figure 41 shows a front elevation; and

Figure 41$^A$ an end elevation of a similar brace and tie member employed in the block as shown in Figure 39;

Figure 42 is a plan view; and

Figure 42$^A$ an end view of the upper slab as shown in Figures 34 and 35;

Figure 43 is a plan view; and

Figure 43$^A$ an end elevation of the intermediate slab as shown in Figures 34 and 35.

For the purpose of illustration, a practical embodiment of the invention is shown in connection with a switch gear unit forming a part of the electrical equipment of a power station. This unit includes three buses A, B, and C, which constitute a part of a three-phase power circuit fed from a source of power not shown. A plurality of groups of feeders 1$^a$, 1$^b$, and 1$^c$ are connected to the respective buses at regular intervals through oil circuit breakers 2$^a$, 2$^b$ and 2$^c$, disconnecting switches 3$^a$, 3$^b$, and 3$^c$ and taps 4$^a$, 4$^b$ and 4$^c$, respectively. The groups of feeders lead to transformers (not shown) or other apparatus from whence the power is delivered to various work circuits. Since electrical systems of this character are well known in the art a further or more detailed description of the same is deemed unnecessary.

The structure illustrated in Figures 1 to 5 comprises a compact arrangement of readily accessible cells or compartments for receiving the buses, oil circuit breakers, etc., just referred to. This embodiment shows the disconnecting switches above and the buses below, employing a well known form of oil circuit breaker to which connection is made at the top. This structure includes an upright wall or partition 10 resting upon the floor 11 of the building. The wall 10 is preferably formed of concrete in place after the various precast pieces or units are assembled in order to secure the desired union of the units into a common structure having strength and stability.

A series of vertical partitions 12, preferably in the form of precast rectangular slabs, divide the space at one side of the wall 10 into rows of cells 13 each adapted to receive an oil circuit breaker 2 of standard construction. The slabs rest upon the floor 11 and extend upwardly preferably beyond the top of the wall 10, their inner edges 15 being embedded in the poured wall 10 as indicated in Figure 5. A frame or plate 16 extending across the tops of the partitions 12 forms a convenient support for the oil circuit breaker operating mechanisms 17.

The bus compartments and the cells for the disconnecting switches are arranged upon the opposite side of the partition 10. The construction of the bus compartments, as well as their arrangement with respect to the oil circuit breaker cells 13, is novel and of importance. The bus compartments are built up of precast units to form in effect a hollow wall preferably spaced from the partition 10 as shown in Figure 3, by other precast units to form vertical conduits for the taps 4. The hollow wall containing the buses A, B, and C is made up of a number of blocks 18 and 18'. The blocks may be formed of any appropriate fireproof building material such, for instance, as concrete. The blocks are preferably arranged in horizontal tiers one tier above another, the number of tiers corresponding to the number of buses employed.

The blocks of each tier are formed with longitudinal aligned passages 22 therethrough together forming longitudinal conduits in the wall for receiving the busbars or other conductors A, B and C. The blocks are each shorter than the combined width of three of the oil circuit breaker cells 13 by the space 23 necessary for leading out the tap to that bus, and are longitudinally spaced to form transverse openings 23 through the wall and the blocks of each tier are arranged to overlap the blocks of an adjacent tier or tiers. Each opening 23 is opposite a cell 13 so as to permit a connection between the bus at this point and the corresponding oil circuit breaker through the taps and the disconnecting switches. These openings also permit the ready inspection of the buses and connections at these points.

The lowermost tier of blocks rests upon a foundation 25 of any appropriate material such as concrete, the spacing of the blocks in the bottom tier being effected by means of projections 26 extending upwardly from the face of the foundation. This foundation is preferably formed of concrete poured in forms. Blocks 18 such as illustrated in Figure 8 are employed in the lower tiers.

These blocks are provided with projections 27 similar to the projections 26 and serving as spacers for the blocks of the next higher tier. The height or thickness of each of the projections 26 and 27 is preferably equal to the thickness of the wall of an adjacent block so that when assembled the upper surface of each projection is in alignment with and forms a continuation of the lower surface of the longitudinal opening through the adjacent blocks.

Projections 26 and 27 form appropriate mounts for the insulating supports 28 for the busbars A, B and C. The insulating supports 28 may be of any standard construction and are held rigid by bolts extending from the faces of the projections 26 and 27.

The blocks 18' in the top tier are similar to those in the lower tiers except that they are formed with smooth upper faces adapted to receive a flat cover plate or slab 29 forming the top of the wall.

Upright channel shaped blocks 30 such as illustrated in Figure 6 are interposed between this wall and the partition 10. (See Figures 3 and 5.) These blocks are arranged side by side with the open side of each in register with the transverse opening 23 through the hollow wall. Each block 30 thus forms a conduit or compartment for one of the taps $4^a$, $5^b$, or $4^c$, permitting the tap to be led upwardly to the corresponding disconnecting switches $3^a$, $3^b$ or $3^c$.

The disconnecting switches are arranged in a row above the bus compartment just described and are effectively separated one from another by means of a series of upright partitions 32 preferably in the form of rectangular slabs. These slabs rest with their lower edges upon the top slab 29 of the bus structure and the upper ends of the abutting walls of the channel blocks 30 and extend upwardly preferably to the level of the upper edges of the partitions 12. The inner edges of partitions 32 abut the corresponding edges of the partitions 12 and for a portion of their length are embedded in and embraced by the main partition 10. (See Figures 3 and 4). Plates or slabs 34 form a cover for the disconnecting switch cells thus formed.

Switch panels 35 of any approved construction are preferably mounted above the main wall 10 and between the partitions 32 to support the disconnecting switches $3^a$, $3^b$ and $3^c$ and the leads 36 connecting the oil circuit breaker terminals with the feeders $1^a$, $1^b$ and $1^c$. These panels also effectively separate the oil circuit breaker cells from the disconnecting switch cells.

In installing the electrical apparatus in the structure just described the oil circuit breakers $2^a$, $2^b$ and $2^c$ are mounted in their respective cells and the circuit breaker operating mechanisms 17 are mounted upon the cover plate 16 in a well known manner. As shown, the disconnecting switches 3ª, 3ᵇ, and 3ᶜ are secured to the panels 35 and the main wall 10. The bus bars A, B and C are threaded through the conduits formed by the openings 22 through the blocks 18 and 18' and are supported in position by the insulators 28 mounted upon the spacer projections 26 and 27 on the foundation 25 and the blocks, respectively. The taps 4ª, 4ᵇ, and 4ᶜ are connected with the respective busbars at intervals through the transverse openings 23 and are led upwardly to the disconnecting switches 3ª, 3ᵇ, and 3ᶜ. The other terminals of the disconnecting switches extend through the panels 35 and are electrically connected with the oil circuit breakers through the leads 14. The feeders 1ª, 1ᵇ, and 1ᶜ extend through suitable insulating bushings 37 in the cover plate 34 and are connected with the oil switches through the leads 36 which are threaded through suitable insulating bushings 18 in the panels 35.

The oil circuit breaker cells 13 are preferably closed by panels or doors 75 as illustrated in section in Figure 3, these doors being hung on the track formed by the edge of the channel 76. The disconnecting switch cells are also closed by panels or doors 77 hung on the edge of the angle iron 78. The outside openings 23 between blocks in the hollow wall are also preferably closed by doors or panels. Thus the entire structure is enclosed to exclude dust and to prevent accidental contacts and at the same time to furnish a neat appearance.

Thus it will be seen that an exceedingly compact structure has been provided in which all the contained parts are well spaced and effectively separated. It will also be noted that although all the contained parts are well guarded against accidental contact, nevertheless ready access may be had to any of the cells or compartments for inspecting or operating these parts. By the use of preformed or precast structural units such as described, the erection of structures of this character is greatly facilitated and the cost thereof accordingly reduced.

In Figures 9 to 12 we have illustrated a modification of the form shown in Figures 1 to 5. In this construction instead of employing the precast blocks 30 as shown in Figure 6 (and shown in section in Figures 3 and 5) we employ vertical slabs 79 which are set into the center wall 10 as shown in Figures 11 and 12 and which have their front edges lying against the hollow bus containing wall. Otherwise this form is the same as shown in Figures 1 to 5.

The slabs 32 rest upon the slabs 29 and slabs 79 and extend into the wall 10 when on the rear side they abut against the slabs 12. The wall 10 thus is in each case the only part that is poured in place, and in view of the regularity and symmetry of the construction the forms may be used as fast as the concrete sets in continuous and repeated operation.

The structure illustrated in Figures 13 to 18 is similar in many respects to that just described. It includes a main wall or partition having on one side a row of oil circuit breaker cells and on the other side a series of disconnecting switch cells and a bank or wall of bus compartments. This structure is, however, designed for use with oil circuit breakers having their outside terminals positioned at the bottom thereof. For this reason the disconnecting switches are arranged beneath rather than above the bus compartments. Furthermore this structure contains a series of additional disconnecting switch cells in addition to the cells provided in the structure just described. This embodiment is particularly useful where the oil circuit breaker connects a main busbar and an auxiliary busbar. In that case the oil circuit breaker is provided with disconnecting switches upon each side so that it may not be rendered live from either busbar.

This form of device is particularly well adapted to the employment of the compact form of bus structure disclosed in the application of Allen M. Rossman, Serial No. 476,701, filed June 11, 1921, in which the buses are in the form of cables led through conduits embedded in the concrete floor upon which the present construction is adapted to rest as shown in Figure 14.

The structure illustrated in Figures 13 to 18 is built up in sections the number of cells of each character in a single section depending upon the number of buses employed. Since the buses are three in number each section contains three anterior disconnecting switch cells, three posterior disconnecting switch cells and three oil circuit breaker cells.

The three anterior cells 38 are formed by two channel shaped blocks 80 and 81 such as shown in Figures 19 and 20 arranged on opposite sides of a short locking wall or pillar 40 extending from the floor 11' of the building to the top of the structure. This wall 40 is poured in place and locks the parts together. The channels or longitudinal openings in the blocks 80—81 form cells for two of the anterior switches 82 while the third occupies the space between the blocks. A prepared slab 41 of soapstone, slate, concrete or composition, positioned beneath the blocks 80 and 81, forms the bottom of the cells 38 while a similar slab 42 covering the blocks forms a fireproof insulating barrier between these anterior cells and the oil circuit breaker cells 13' arranged above.

The oil circuit breaker cells 13' are contained within the space between two walls or barriers 43 which are poured in place above the slab 42 covering the fuse cells and resting upon the walls of the channel blocks 80 and 81. This space is divided into three compartments by means of two upright precast slabs or partitions 44 which also rest upon the slab 42. A cover plate 45 formed of a prepared slab is mounted upon the upper edges of the upright partitions 44 and the pillars, and this slab 45 forms a convenient support for the oil circuit breaker operating mechanism 17'.

Referring again to the blocks 80 and 81, it will be noted that they are provided with tongues or projections 86 and 87. These projections in conjunction with the locking walls or pillars 40 effect the desired spacing of the upright slabs or partitions 84 and 85 forming cells for the disconnecting switches $3^x$, $3^y$, and $3^z$. It is to be noted that the entire construction is arranged in groups of three for the three phases. The slabs 84 are thicker than the slabs 85 and provide the dividing walls between feeders. The walls 43 perform the same function upon the other side and also provide the desired mechanical strength to support the oil circuit breakers and operating mechanism.

It will be noted that the projections 86 and 87 on the backs of the channels are arranged as lefts and rights so that the notches 88 and 89 of contiguous blocks for adjacent phases provide recesses for receiving the ends of the precast slabs 84 as shown in Figure 18.

The notches 93 and 94 on the other sides of the projections are arranged to receive the ends of the slabs 85 and the poured wall or post of concrete 40 locks the blocks and slabs together.

The projections 86 and 87 on the channel blocks 80 and 81 extend beyond the ends of the blocks, on the bottom for a distance equal to the thickness of the lower slab 41 and on the top for a distance equal to the thickness of the upper slab 42. These blocks or channels 80 and 81 are also provided with openings 90 and 91 through which the conductors $4^x$ and $4^z$ are led. Insulating bushings 92 fit into the openings 90 and 91 and keep the conductors out of contact with the walls. The slabs 84 and 85 rest upon the floor 11' and extend upwardly so as to partially overlap the partitions 44 between the oil circuit breaker cells 13'. It will be noted from an inspection of Figure 17 that the locking wall or pillar 40 forms a barrier between the central disconnecting switch cell and the central oil circuit breaker cell of each set. The two end cells of each set are separated by blocks such as illustrated at 47 in Figure 24. As shown the vertical edges 46 of these blocks are shaped to fit the abutting edges of the slabs 44 and 45 on one side and partition wall 43 on the other.

The locking wall 40 continues upward between the slabs 85 and 44 locking them in place against the blocks 47. The heavier partition slabs 84 rest against the other edges of the blocks 47 as shown in Figure 17 and the poured walls or partitions 43 lock the blocks 47 and the slabs 84 in place. The slabs 44 and the partition walls 43 extend to the tops of the circuit breaker cells. On the other side of the central longitudinal wall and above the slabs 84 and 85 we have mounted the bus structure proper which is spaced away from the central longitudinal wall by vertical conduits for the conductors which join the bus bars X, Y and Z.

The bus compartment structure is formed and erected in a manner similar to that hereinbefore described. It comprises a hollow bank or wall built up of hollow blocks 48 and 48' arranged in tiers, one tier above another. The blocks in each tier are in alignment so that the openings 49 therethrough form longitudinal passages in the wall for receiving the bus bars or other conductors X, Y, and Z. The blocks of each tier are also spaced apart to form transverse openings 53 through the wall, through which the taps or leads are brought to make connection with the bus bars.

The blocks 48 in the intermediate tier are formed with projections 54 and 55 on their upper and lower faces to effect the spacing of the blocks 48' in the top and bottom tiers, respectively, and to form a proper foundation for mounting the insulated bus supports. The blocks 48' of the top and bottom tiers are also provided with similar projections 55' and 54' respectively, for insuring the proper spacing of the blocks 48 in the intermediate tier, and mounting of the bus supports. The wall of blocks rests upon a slab 25' supported by the partitions 84 and 85 and is covered by a similar slab 29'. The bottom slab 25' and top slab 29' are provided with spacer projections $54^2$ and $55^2$ respectively similar to the projections formed on the blocks and for the same purpose. These spacer projections form convenient mounts for the insulating supports 28' for the buses X, Y and Z, which in this case are braced above and below to withstand the stresses tending to move the buses apart. An insulating support 28' is mounted in each transverse opening 53 and as shown is expanded against and between the opposed spacer projections forming the top and bottom of each opening. The insulating support in this case is placed to one side of the transverse openings and the tap is led off centrally of the opening.

Taps $4^x$, $4^y$, and $4^z$ lead rearwardly from the bus bars X, Y and Z respectively through the transverse openings 53 between the hollow blocks and then downwardly to the disconnecting switches 3ˣ, 3ʸ and 3ᶻ. In order to provide suitable compartments for these taps channel shaped blocks such as shown at 95 and 96 (see Figures 26 and 25) are employed. Blocks 95 and 96 are similar to the blocks 80 and 81 previously described in that they are provided with tongues or projections 97 and 98, forming spacing means for the slabs 44.

The slabs 44 are set in recesses along the sides of the projections 97 and 98 and are locked in place by the upward continuation of the wall or post 40. The recesses along the other sides of the projections receive the continuations of the walls 43 which form partitions between the phases as shown in Figure 16. The insulating supports 100 are mounted in the backs of the channel blocks 96 and 101 and the side of the wall 40 so as to provide proper support for the corresponding taps or leads 4. The uppermost support 100 is mounted in one of the uppermost blocks, namely block 101, as shown in dotted lines in Figure 14 and in full lines in Figure 15.

The blocks 101 and 102 are set upon the blocks 95 and 96 respectively, the blocks 95 and 96 being set partly upon the tops of the blocks 47 and partly upon the upper edges of the slabs 84 and 85. The blocks 101, 102 and 95 and 96 thus provide suitable vertical channels 59 for the taps or leads 4. These blocks 101 and 102 have the projections 103 and 104 upon their back sides, these projections being cut away at the corners to provide the notches or grooves 105 and 106. The notches 105 are adapted to receive the upper ends of the slabs 44, which are locked in place by the uppermost continuation of the wall 40. The notches 106 are adapted to receive the upper ends of the partition walls 43 which end at the same level as the tops of the slabs 44. The upper ends of the blocks 101 and 102 are covered by means of slabs 108.

From the above description it can be seen that the entire construction with the exception of the partition walls 43 and the locking wall 40 can be precast. This permits of rapid construction. All that needs to be poured is the walls 43 and 40 and very simple forms suffice for this work.

In Figures 30 to 33 inclusive, we have illustrated a modified form of bus mounting and cell construction in which bottom connected oil circuit breakers are used and in which the bus structure is mounted above the cells for the disconnecting switches between the buses and the oil circuit breakers.

The compartments or cells for the disconnecting switches 82 are formed below the oil circuit breakers by means of a bottom plate or slab 110 which bottom slab covers an opening 111 in the floor 11 to permit connection of the one terminal of the oil circuit breaker with the feeder 112 which is preferably led through a suitable conduit embedded within the concrete of the floor 11 as is explained in the copending application of Allen M. Rossman, above referred to. These feeder conductors 112 and similar conductors are led in groups of three for three phase construction as shown in Fig. 30 through conduits formed in the floor 11. In order to support the floor, suitable metallic reinforcements, in this case the I-beams 170, extend transversely of the central longitudinal wall. These I-beams 170 are suitably embedded in the concrete floor 11. The disposition of the conductors in conduits extending parallel to these I-beams is highly advantageous as it permits them to run transversely to the superposed bus structure to make connection therewith without crossing said supporting beams. These beams are advantageously disposed transversely under the longitudinal wall and bus structure since thereby they are able to support the wall and bus structure without undue stress upon any one element. The holes in the floor are placed between the beams so that they are in line with the conductors 112, and due to the disposal of the beams 170 transversely of the wall and bus structure these holes do not cause any particular weakness. This construction is employed in the forms shown in both Figs. 30 to 33 and in Figs. 13 to 29.

The cells are arranged in groups of three between partitions 113, the individual cells being formed by the slabs or plates 114 which lie flush with the front edges of the partitions 113 and which at the rear are embedded in a central concrete wall 115. The partitions 113 and the central wall 115 are poured in place, as are also the partitions 116 on the other side of the central wall 115.

The cells for the disconnecting switches 117, which are connected between the buses X, Y and Z and the corresponding oil circuit breakers are formed in groups of three between the partitions 116, the individual cells being formed by the partitions 118.

The circuit breaker cells 119 are formed tween the partitions 113 being separated into individual cells by means of the slabs 120, which are also embedded in the central wall 115. The tops of the circuit breaker cells are covered over by means of the slab or plate 121 upon which are supported the circuit breaker operating mechanisms 122. Conductors for operating the circuit breaker operating mechanisms 122, may be led through a conduit embedded in the partitions 116 and 113. This conduit is shown in dotted lines at 123 in Figure 31.

The conduits for the taps 124 connecting the buses with the oil circuit breakers are formed by the partitions 116 and the slabs 125. These slabs are also set at their rear edges in the central wall 115, their forward edges lying in contact with the hollow blocks 126 and 127 through which the buses are threaded.

These slabs 125 rest at their lower edges on the slabs 118 and at their upper edges are covered over by the slabs 128.

The hollow wall for the buses X, Y and Z are formed of hollow blocks 126 and 127 and top and bottom plates or slabs 129, as previously described in connection with Figure 13. The blocks of each tier are separated to provide the openings 130 through which the taps are led down to the vertical conduit 131 to the disconnecting switches 117 and thence to the oil circuit breakers as previously described. These openings 130 are adapted to be closed by small doors 130' held in place by spring fingers or otherwise.

The taps 124 in this case are led off substantially centrally from the openings 130, but the insulator supports 132, which are mounted on the thickened portions of the blocks, are straight at one side of the opening to permit the connection of the tap and the bus to be accessible from the opening.

The insulating supports 132 are braced against the top and bottom projections of adjacent blocks so as to hold the buses firmly in position. The blocks 126, 127 and 129 herein shown, are similar to those employed in building the construction shown in Figure 13.

The openings in the front of the disconnecting switch cells 133 are closed by fireproof panels 134 which close off these openings in groups of three. Suitable pilasters or finishing pieces 135 may be fastened to the partitions adjacent the panels 134. This gives the entire front a finished appearance and prevents the entry of dust into the bus compartment or the switch cells. The panels are provided with suitable handles and the panels 134 are preferably held to the pilasters by means of suitable spring fingers 136.

In the form of device shown in Figures 30 to 33 inclusive, it will be noted that the partitions are poured in place as is the central wall 115. This means that more form work is required in this particular embodiment than is required in the forms previously shown. However, it has the particular advantage that nothing but slabs are employed for the construction of the cells and the conduits for the taps, the only blocks in this case being those employed for the bus structure proper.

In the various embodiments which we have illustrated and described the common advantage of the bus construction made of precast blocks or units is present as also is the general advantage of being able to do most of the work of precasting certain portions of the constructions so that they may be assembled with a certain amount of work poured in place. The resulting structure is substantial, compact and may be made very attractive in appearance and offers the further advantage of accessibility and simplicity.

In Figures 34 and 35, we have illustrated the preferred construction for housing the potential transformers and fuse switches therefor. The two transformers 140 and 141 are connected to two of the phases of the circuits or bus under consideration. The conductors 142 and 143 leading from the transformer 140 pass up through insulators 144 and 145 to the fuse switches 146 and 147 and from thence out through the insulators 148 and 149. In the same manner, the conductors 150 and 151 are led through the insulating tubes or bushings 152 and 153 to the fuse switches 147 and 154, and thence out through the top of the structure by way of the insulating bushings or tubes 149 and 155. It will be noted that the two conductors 143 and 151 are connected in common to the fuse switch 147 which lies in the central compartment between the switches 146 and 154.

The transformers 140 and 141 are mounted in precast housings 156 and 157 which are similar in construction, but are left and right as will be appreciated from a study of Figure 34. These blocks or housings are precast in special forms to produce the particular form shown. In precasting these blocks 156 and 157, we will take block 156 as an example. It will be seen from Figure 39, as well as from Figures 34, 35 and 37 that this block 156 comprises the back portion 158 and the side walls 159 and 160. The front edges of the side walls are braced at top and bottom or tied together by the cross members 161 and 162 as is clearly shown in Figure 39. These tie members 161 and 162 are reinforced with rods or wires 163 and 164. The tie members or connecting pieces 161 and 162 are precast with the reinforcing rods or wires 163 and 164 in place and thereafter the block itself is cast in the mould to include these cross pieces 161 and 162 whereby the completed block has its corners tied together by the cross pieces the ends of the reinforcing rods or wires extending into the side walls 159 and 160. These blocks which form the cells for the transformers 140 and 141 are set upon a suitable foundation as, for instance the foundation 165 which is made of concrete and which serves as a suitable foundation for the transformers 140 and 141. The switch cells for the fuse switches 146, 147 and 154 are formed in a manner similar to the cells 156 and 157 for the transformers.

The block 166 is provided with back and side walls 167' and 168' and 169 respectively. The side walls 168 and 169 are tied together by the cross pieces 170 and 171, which are precast with reinforcing rods 172 and 173, and are then put in place in the mould and the rest of the block is cast about them as previously explained in connection with the block shown in Figure 39.

Between the transformer cells and the switch cells, we have provided a precast slab 175 as is shown in Figures 43 and 43<sup>A</sup>. This slab has perforations 176, 177, 178, and 179 for mounting the insulating bushings 144, 145 152 and 153. It will be noted that the location of these openings for the bushings is such as to permit the bushing 145 to communicate at its upper end with the switch cell 166 and at its lower end with the transformer cell 156. In a similar manner, the bushing 152 communicates at its upper end with the central switch cell 166 and at its lower end with the transformer cell 157.

The upper end of the disconnecting switch cell is closed by the precast slab 180 which has the openings 181, 182 and 183 for receiving the insulating bushings 148, 149 and 155.

The switch cells are closed by cover panels 185 and the transformer cells are closed by cover panels 186 as indicated in Figure 35. The construction above described can be very rapidly and accurately assembled and it provides a satisfactory and attractive construction.

We do not intend to be limited to the precise constructions shown and described.

We claim:

1. A structure of the character described including a wall composed of a plurality of blocks arranged in tiers, said blocks having passageways therethrough forming longitudinal channels in said wall for receiving conductors such as bus bars, the blocks of each tier being spaced apart to form transverse openings through said wall to provide outlets for taps, and blocks positioned adjacent said wall forming channels communicating with said transverse openings.

2. A structure of the character described having a row of cells, a wall of hollow blocks arranged in tiers and forming a plurality of passages substantially parallel to said row of cells and adapted to receive bus bars, the blocks of each tier being spaced apart to form a plurality of openings through said wall corresponding in number to the number of cells to permit taps to be taken from the bus bar to the cells.

3. In combination, a plurality of blocks, said blocks being built into a wall in tiers, each block having a longitudinal passageway therethrough in which a bus bar is adapted to be supported, said blocks being spaced apart longitudinally in each tier to permit access to the bus bar.

4. In combination, a wall formed of blocks, said blocks being laid in tiers, the blocks in each tier being spaced apart to form transverse openings through the wall, said blocks having longitudinal openings which are in register and form longitudinal passageways through the wall, conductors extending through said passageways and means at said transverse openings for supporting said conductors.

5. As an article of manufacture, a block of insulating material comprising a generally prismatic body having a horizontal opening therethrough, said opening being defined by walls of substantially equal thickness, one of said walls having a lateral projection forming a spacing member and forming a mounting for an insulator, said spacing member being of the full width of the block and of less length than the full length of the block endwise and being adapted to space adjacent blocks apart endwise.

6. As an article of manufacture, a prismatic block of building material, said block having a longitudinal opening, the longitudinal opening being defined by walls of substantially equal thickness, one of said walls having a thickened portion of a length substantially equal to half the length of the block and having its outermost surface substantially parallel with the axis of the opening, said projecting portion being of a depth of the general order of the thickness of the walls defining the opening and being adapted to support an insulator in line with the longitudinal opening of another block.

7. As an article of manufacture, a hollow block of insulating material having a longitudinal opening providing a passageway for an air insulated bus conductor, said opening being defined by suitable vertical and horizontal walls, one of the horizontal walls having a flat projecting spacing member formed near one end of the block, said spacing member occupying substantially the full width of the block.

8. As an article of manufacture, a hollow block of insulating material having a longitudinal opening providing a passageway for an air insulated bus conductor, said opening being defined by suitable vertical and horizontal walls, one of the horizontal walls having a flat projecting spacing member formed near one end of the block, said spacing member occupying substantially the full width of the block, and bus supported means mounted on said spacing member.

9. A hollow block of insulating material having a longitudinal opening providing a passageway for an air insulated bus conductor, said opening being defined by suitable vertical and horizontal walls, one of the horizontal walls having a flat projecting spacing member formed near one end of the block, and a bus conductor extending thru said longitudinal opening and being supported independently of the walls of the block.

10. In combination, a plurality of blocks having longitudinal openings therein, said longitudinal openings being in alignment, supporting means for said blocks, said supporting means having projections at regular intervals for spacing the blocks, each spacing means comprising a projection having an upper surface substantially in alignment with the lower surface of the opening in an adjacent block and adapted to support an insulator for carrying a bus bar through the aligned openings.

11. In combination, a plurality of blocks having longitudinal openings therein, said longitudinal openings being in alignment, supporting means for said blocks, said supporting means having projections at regular intervals for spacing the blocks, each spacing means comprising a projection having an upper surface substantially in alignment with the lower surface of the opening in an adjacent block and insulators mounted on said spacing means and a conductor threaded through said openings and mounted on said insulators.

12. In a device of the class described, a wall comprising a plurality of tiers of hollow blocks, said blocks having passageways extending therethrough longitudinally, said passageways being in alignment, the blocks in each tier being spaced apart from each other to form transverse openings through the wall, conductors extending through the longitudinal passageways of the blocks in each tier, and means extending from the outer surface of a block in one tier for supporting the conductors in an adjacent tier.

13. In a device of the class described, a wall comprising tiers of hollow blocks, said blocks having longitudinal passageways extending in alignment with each other longitudinally of the wall, the blocks in each tier being spaced from each other to form transverse openings, said blocks having projecting portions for spacing the blocks in an adjacent tier, said spacing means comprising a projecting portion on each individual block, said projecting portion extending outwardly from each individual block substantially the thickness of the wall of the hollow blocks of the adjacent tier and being adapted to support insulators for threading conductors through the longitudinal passageways.

14. In a device of the class described, a wall comprising a plurality of tiers of blocks, said blocks having longitudinal openings in alignment with each other to form longitudinal passageways in the wall the blocks in each tier being spaced apart to form transverse openings in the wall, and insulating means mounted on the surfaces of the blocks of an adjacent tier, said means extending into the transverse openings of one tier and conducting means extending through the longitudinal openings of the blocks in one tier, said conducting means being supported on said insulating means.

15. In combination, a wall comprising a plurality of tiers of individual blocks, said individual blocks having longitudinal passageways therethrough, said passageways being in alignment to form a longitudinal opening in the wall, the blocks in each tier being spaced apart to form the transverse openings, insulating means mounted in said transverse openings, conductors extending through the longitudinal passageways and mounted on said insulators, and lateral taps extending from said conductors through said openings.

16. In combination, a plurality of tiers of individual blocks built into a wall, the blocks in each tier being spaced apart to form transverse passageways through the wall, the blocks in each tier having longitudinal passageways forming a longitudinal opening through the wall, conductors mounted in said longitudinal passageways, taps extending from the conductors through said openings and removable means closing some of said openings.

17. In combination, a plurality of tiers of individual blocks laid in a wall, the blocks of each tier being spaced apart longitudinally to form transverse openings, each of the blocks having an opening therethrough longitudinally of the wall, said longitudinal openings being in alignment to form a longitudinal passageway of each tier, conductors mounted in the longitudinal openings of each tier, insulating means supporting said conductors and removable means closing the transverse openings.

18. In a structure of the class described, a wall of building material, said wall having a longitudinal passageway therein, and a bare conductor supported at intervals within the interior of said passageway, insulating means forming said support, said wall having a transverse opening therethrough communicating with the longitudinal passageway and a tap connected with the conductor, said tap extending laterally out of the opening, said insulating means being placed at the intersections of said passageway and said transverse opening.

19. In combination, a wall comprising a plurality of similar blocks, said blocks having substantially flat faces and having longitudinal passageways therethrough, means on the exterior surfaces of the blocks for supporting insulators, insulators mounted on said means and being in line with the central parts of said longitudinal passageways and conductors mounted on said insulators and being threaded through said longitudinal passageways.

20. In combination, a plurality of hollow blocks aligned endwise to define a single longitudinal passageway, said blocks being spaced apart to provide lateral openings communicating with said passageway, a conductor extending substantially centrally thru said passageway, and supporting means for the conductor, said supporting means being located at said spaces between blocks.

21. In combination, a plurality of hollow blocks aligned endwise to define a single longitudinal passageway, said blocks being spaced apart to provide later openings communicating with said passageway, a conductor extending substantially centrally thru said passageway and supporting means for the conductor, said supporting means being located at said spaces between blocks, and taps from the conductor taken off at said points of support and being led out thru said lateral openings.

22. In combination, a longitudinal vertical wall, transverse partitions extending substantially in register with each other from opposite sides of said wall, horizontal partitions extending longitudinally on one side of the wall and forming in connection with the vertical partitions on said one side a plurality of horizontal tiers of cells, the upper cells being adapted to contain circuit breakers, the lower cells being adapted to contain disconnects, the transverse partitions on the other side of said longitudinal wall defining vertical cells for housing taps leading from the circuit breakers, said transverse partitions having their lower portions extending out beyond the upper portions, a bus support structure mounted above the lower extending portions of said latter partitions, said bus supporting structure comprising a plurality of tiers of hollow blocks laid upon each other to define tubular passageways for receiving bus conductors, the blocks of each tier being spaced apart to form openings in register with certain noncontiguous ones of said vertical cells to permit connection from the bus conductors to the taps in said vertical cells, said partitions being embedded in and bounded by said longitudinal wall.

23. In combination, a longitudinal vertical wall, transverse partitions extending substantially in register with each other from opposite sides of said wall to define cells upon opposite sides of said wall, the cells on one side of said wall containing circuit breakers, taps from said circuit breakers leading thru the longitudinal vertical wall into the cells on the other side of said longitudinal wall, a bus supporting structure on said other side of the wall, said bus supporting structure comprising a plurality of tiers of hollow blocks laid upon each other to define tubular passageways, bus conductors in said passageways, the blocks of each tier being spaced apart to form openings in register with non-contiguous ones of the vertical cells on said other side of the longitudinal wall, said taps in said latter cells being connected to the bus conductors thru the registering spaces formed between ends of the hollow blocks, said partitions being anchored in and bounded by said wall.

24. In combination, a longitudinal vertical wall, a series of vertical transverse partitions extending out from one side of said wall to define vertical cells, a bus supporting structure on the same side of said longitudinal wall, said bus supporting structure comprising a longitudinal series of hollow tubular blocks spaced apart to form openings in register with non-contiguous ones of said cells, conductors disposed in said cells and extending into the spaces between said blocks, and a bus conductor supported in said longitudinal series of blocks and being connected to said conductors in said cells.

25. In combination, a longitudinal vertical wall, a series of vertical partitions extending outwardly from said wall along one side thereof, a bus supporting structure spaced from said longitudinal wall but extending parallel therewith, said bus supporting structure comprising a plurality of tiers of hollow blocks laid upon each other to define tubular passageways, bus conductors threaded thru said passageways and supported out of contact with the walls thereof, the blocks of each tier being spaced apart to form openings which are in register with the spaces between the vertical partitions and vertically disposed conductors lying in the spaces between partitions and being connected to said bus conductors at said spaces between the ends of adjacent blocks.

26. In combination, a three-phase bus and switch structure comprising a longitudinal wall, a series of transverse vertical partitions extending from one side of the wall to form vertical cells in groups of three for three phases, a bus structure comprising three tiers of hollow blocks laid upon each other to form horizontal passageways, bus conductors disposed in each passageway, said blocks being of a length substantially equal to the width of two of said vertical cells, said blocks of each tier being spaced apart at their adjacent ends a distance substantially equal to the width of one of said vertical cells, the spaces between blocks of adjacent tiers being out of register.

27. In combination, a three-phase bus and switch structure comprising a longitudinal wall, a series of transverse vertical partitions extending from one side of the wall to form vertical cells, said cells being disposed in groups of three for the three phases, a bus structure comprising three tiers of hollow blocks laid upon each other to form horizontal passageways, bus conductors disposed in said passageways, said blocks being of a length substantially equal to the width of two of said vertical cells and being spaced apart at their adjacent ends a distance substantially equal to the width of one of said vertical cells, the spaces between blocks of adjacent tiers being out of register to provide communication between vertical cells of each phase and the bus conductors of the corresponding phases and branch conductors disposed in said vertical cells connecting with the corresponding bus conductors.

28. In combination, a series of transverse vertical partitions equally spaced to form vertical cells in groups of three for three-phase distribution, a bus structure extending transversely of vertical partitions, said bus structure comprising three tiers of hollow blocks laid upon each other to form horizontal passageways, a bus conductor disposed in each passageway, said blocks being of a length substantially equal to the width of two of said vertical cells, and being spaced apart endwise a distance substantially equal to the width of one of said vertical cells, the spaces of the successive tiers being in register with the successive vertical cells.

29. In combination, a series of channel shaped blocks having side walls and back walls, said blocks being set side by side upon their ends to define a longitudinal vertical wall formed of the backs, with transverse partitions formed of the side walls, said longitudinal wall and transverse partitions defining vertical cells and vertical phase conductors housed in said cells.

30. In combination, a series of channel shaped blocks set side by side upon their ends to define a longitudinal wall with transverse partitions defining cells, phase conductors in said cells, a bus structure comprising three tiers of hollow blocks laid end to end with spaces between them, said spaces registering with said cells and bus conductors threaded thru the hollow blocks of each tier.

31. In combination, a series of channel shaped blocks placed upon their ends side by side, said blocks having back walls and side walls, a main longitudinal wall formed in part of the back walls of said blocks, the side walls of said blocks defining a series of vertical cells upon one side of said main wall, and transverse vertical partitions upon the opposite sides of said main wall and anchored in said main wall to define vertical cells in register with the cells defined by said channel shaped blocks.

32. A channel shaped block having side walls and back wall, said back wall having a boss integral with the back of the same of less width than the block and of a length different from that of the length of the block.

33. In combination, a pair of channel shaped blocks having side walls and back wall, said blocks being placed side by side with the adjacent side walls in contact vertically, said blocks having registering longitudinal grooves formed in the adjacent portions of the back walls of the same, and a vertically disposed slab having a vertical marginal portion thereof disposed in the space defined by said grooves.

34. In combination, a channel block having side walls and a back wall, an insulator on said back wall, and a conductor extending between the side walls and supported on said insulator.

35. A vertical channel block having side walls and a back wall, a groove cut longitudinally in each corner of the back wall the full length of the block, said grooves being adapted to receive the edges of vertical slabs, and means on the inside of the back wall for mounting an electric conductor.

36. In a cell structure, a channel block, having side walls and a back wall, the back wall having a groove cut down each corner thereof, flat vertical panels having their edges set in said grooves, said blocks forming a cell on one side and said panels forming a cell on the other side of the back of said block.

37. In a cell structure, a pair of vertical channel blocks set side by side with a space between them substantially equal to the interior width of one of said channel blocks, said channel blocks having grooves along the back corners thereof, four flat vertical panels having their edges set in said grooves, and a filling between the inner ends of the two central panels, said filling lying in line with the backs of the blocks to form a continuous wall with three cells on each side thereof.

38. In combination, a vertical longitudinal wall, a series of vertical partitions extending out laterally from the wall to define a series of disconnect cells, a bus structure parallel to the wall and mounted on said partitions, said bus structure comprising three tiers of hollow blocks, the blocks of each tier being spaced apart, the spaces between blocks of the respective tiers being staggered and being in register with corresponding ones of said cells, a longitudinal bus conductor housed in and extending through the blocks of a tier for all three tiers.

39. In combination, a vertical longitudinal wall, a series of vertical partitions extending out laterally from the wall to define a series of disconnect cells, a bus structure parallel to the wall and mounted on said partitions, said bus structure comprising three tiers of hollow blocks, the blocks of each tier being spaced apart, the spaces between blocks of the respective tiers being staggered and being in register with corresponding ones of said cells, a longitudinal bus conductor housed in and extending through the blocks of a tier for all three tiers, and taps taken off at said openings, said taps extending into said disconnect cells and disconnecting switches mounted in said cells and connected to said taps.

In witness whereof we hereunto subscribe our names this 7th day of May, 1920.

ALLEN M. ROSSMAN.
JOHN C. SANDERSON.